US006877904B2

(12) United States Patent
Bouille

(10) Patent No.: US 6,877,904 B2
(45) Date of Patent: Apr. 12, 2005

(54) HYBRID CONTACT ROLLER BEARING FOR VACUUM PUMP

(75) Inventor: André Bouille, Annecy (FR)

(73) Assignee: Alcatel, Paris (FR)

( * ) Notice: Subject to any disclaimer, the term of this patent is extended or adjusted under 35 U.S.C. 154(b) by 295 days.

(21) Appl. No.: 10/070,362

(22) PCT Filed: Jul. 5, 2001

(86) PCT No.: PCT/FR01/02151

§ 371 (c)(1),
(2), (4) Date: Mar. 5, 2002

(87) PCT Pub. No.: WO02/02957

PCT Pub. Date: Jan. 10, 2002

(65) Prior Publication Data

US 2002/0136476 A1 Sep. 26, 2002

(30) Foreign Application Priority Data

Jul. 6, 2000 (FR) .............................................. 00 08795

(51) Int. Cl.$^7$ ............................................... F16C 33/32
(52) U.S. Cl. ................................................... 384/492
(58) Field of Search ................................. 384/102, 101, 384/492, 565

(56) References Cited

FOREIGN PATENT DOCUMENTS

| DE | 19729450 | 2/1999 |
| EP | 0 711 929 A1 | 5/1996 |
| FR | 1 540 168 | 9/1968 |

*Primary Examiner*—Lenard A. Footland
(74) *Attorney, Agent, or Firm*—Sughrue Mion, PLLC

(57) ABSTRACT

The invention concerns a contact roller bearing for a vacuum pump comprising a rotor roller bearing ring (12) a coaxial stator roller bearing ring (13) between which are provided rolling elements (14a, 14b, 14c, 14d) housed in succession and urged to roll on respective raceways of the rotor (12) and stator (13) roller bearing rings. The rolling elements comprise an alternating succession of rolling elements (14a, 14c) whereof the outer surface is made of steel and of rolling elements (14b, 14d) whereof the outer surface is made of ceramic, thereby reducing the resistance to acceleration of the contact roller bearing, which limits the friction and wear of the inner annular surface (16) of the contact roller and the corresponding bearing of the rotor.

7 Claims, 4 Drawing Sheets

HYBRID CONTACT ROLLER BEARING FOR VACUUM PUMP

TECHNICAL FIELD OF THE INVENTION

The present invention relates to rotor suspensions in vacuum pumps.

In vacuum pumps, a rotor mounted to rotate in a stator is held by magnetic bearings which, in normal operation, keep the rotor in a radially centered position within the stator, holding it centered with specified accuracy and without mechanical contact between the rotor and the stator. Magnetic bearings comprise electromagnets that are powered electrically by appropriate circuits that servo-control the radial position of the rotor within the stator.

The effectiveness with which the rotor is held radially within the stator is determined by the force of the electromagnets, and such holding requires the electromagnets to be powered with sufficient electricity.

Sometimes the normal operation of magnetic bearings can be defective or insufficient, e.g. in the event of the rotor being subjected to a sudden large stress or in the event of the electrical power supply to the electromagnets being interrupted. Under such circumstances, the magnetic bearings no longer serve to center the rotor, and a "landing" step occurs in which the rotor passes from the state in which it is held without mechanical contact to a state in which it is held with mechanical contact. During such landing, the rotor tends to come into contact with the stator. Because the rotor is spinning very fast, e.g. about 30,000 revolutions per minute (rpm), such contact can cause the vacuum pump to be destroyed.

To resolve that problem, proposals have already been made to fit vacuum pumps with secondary mechanical bearings for landing purposes that are based on ball bearings, which serve, in the event of the normal operation of the magnetic bearings failing, to limit radial displacements of the rotor within the stator and to provide approximate centering of the rotor while limiting radial movements of the rotor to a value that is smaller than the size of the airgap of the magnetic bearings.

Nevertheless, the number of landings that are possible without significantly degrading the mechanical bearings remains limited, thus reducing the reliability of the vacuum pump and increasing the frequency with which maintenance operations are required.

There exists a need to increase the number of landings that are possible and to increase the operational lifetime of mechanical landing ball bearings.

The present invention results from the observation that certain failures of mechanical landing ball bearings are the result of the landing ball bearings presenting resistance to acceleration. In normal operation of magnetic bearings having mechanical landing bearings mounted on the stator, the balls in the mechanical landing bearings are stationary relative to the stator; when the magnetic bearings cease to operate, the rotor comes into contact with mechanical landing bearing inner rings that are still stationary, and imparts rotation both to the bearing inner rings and to the rolling parts situated between the inner rings and outer rings; because of the resistance to acceleration presented by the landing bearings, the rotary speed of the inner rings can increase only progressively, such that slip occurs between the rotor and the inner rings of the mechanical landing bearings. This inevitably results in the respective contacting surfaces of the rotor and the inner rings of the mechanical landing bearings being subjected to wear which progressively increases the clearance and reduces the effectiveness of the device; in addition, frictions between the various pieces can sometimes lead to shavings or filings appearing, which then run the risk of jamming the rolling parts of the mechanical bearing.

Wear phenomena and their consequences are particularly accentuated when the inner rings of the mechanical landing bearings are subjected to phenomena that oppose rapid acceleration in rotation which would otherwise enable them to reach the speed of rotation of the rotor quickly.

In this respect, a first cause of a landing bearing resisting acceleration is in its own inertia. Attempts have been made to reduce the inertia of landing bearings by using rolling elements of smaller mass. Thus, attempts have been made to replace traditional rolling elements such as balls of stainless steel with balls made of a ceramic of density that is well below that of steel. Under such circumstances, all of the rolling elements are ceramic balls. This leads to manufacturing cost being very much greater since ceramic balls are much more expensive than steel balls. A small improvement in landing bearing lifetime is indeed observed due to a reduction in the wear phenomena that occur between the rotor and the rings of the rotor bearing. This improvement nevertheless remains insufficient, particularly since it leads to significant extra cost. And this solution using ceramic balls presents another drawback of significantly reducing thermal conductivity between the stator and the rotor, and consequently of reducing the cooling capacity of the rotor.

A second cause of resistance to acceleration in a landing bearing appears to be the friction that occurs between the adjacent rolling elements themselves, which friction appears to be accentuated by the very high accelerations to which the landing bearing is subjected during a landing. The invention takes advantage of this analysis and proposes a solution that enables such frictions to be reduced very significantly.

SUMMARY OF THE INVENTION

Thus, the problem proposed by the present invention is that of designing a new structure for a mechanical ball bearing for landing purposes which presents lifetime that is increased so as to enable a larger number of landings and a longer duration of operation without failure.

To do this, the invention provides a special structure that enables resistance to acceleration of the landing bearing to be reduced as much as possible, and in particular enabling the friction forces which occur between the moving elements of the landing bearing to be reduced, which forces are liable to resist acceleration of the landing bearing during landing.

Another object of the invention is to reduce the cost of producing landing bearings for vacuum pumps, by limiting the use of expensive materials.

In the invention, it is essential for these effects to be obtained without having recourse to lubrication means using liquids that could pollute the vacuum created by the vacuum pump.

To achieve these objects, and others, the invention provides a landing bearing structure for a vacuum pump comprising:

a rotor ring and a coaxial stator ring which define a roller housing between them;

rolling elements housed one after another in the roller housing and rolling on respective running tracks of the rotor and stator rings;

the rolling elements comprising an alternating succession of rolling elements having outside surfaces made of steel and of rolling elements having outside surfaces made of ceramic.

In a simplified embodiment, the rolling elements are spherical balls.

Preferably, the steel rolling elements are made of stainless steel, while the ceramic rolling elements are made of silicon nitride.

The running tracks can be made of stainless steel.

The rolling elements can all have the same diameter when the ball bearing is operating under normal temperature conditions. Normal operating temperatures are usually about 60° C. to 90° C. For this purpose, provision is made for the ceramic rolling elements to be slightly larger in diameter, at ambient temperature, than the steel rolling elements so as to compensate for differences between the coefficients of thermal expansion of ceramic and of steel.

Alternatively, the ceramic rolling elements can be slightly smaller in diameter than the steel rolling elements under normal operating temperature conditions. In practice, it is possible for example to use rolling elements which all have the same diameter at ambient temperature.

A vacuum pump of the invention has at least one landing bearing as defined above.

For example, such a vacuum pump comprises a rotor mounted to rotate in a stator, with at least one radial magnetic bearing which, in normal operation, holds the rotor in a radially centered position inside the stator, and with at least one mechanical landing bearing with a landing ball bearing which, in the event of normal operation of the radial magnetic bearings failing, limits radial displacement of the rotor within the stator by ensuring that the rotor remains approximately centered, radial clearance being provided between one of the rotor or stator rings and the corresponding bearing surface of the rotor or of the stator.

BRIEF DESCRIPTION OF THE DRAWINGS

Other objects, characteristics and advantages of the present invention appear from the following description of particular embodiments given with reference to the accompanying figures, in which.

DESCRIPTION OF THE PREFERRED EMBODIMENTS

Figure 1:
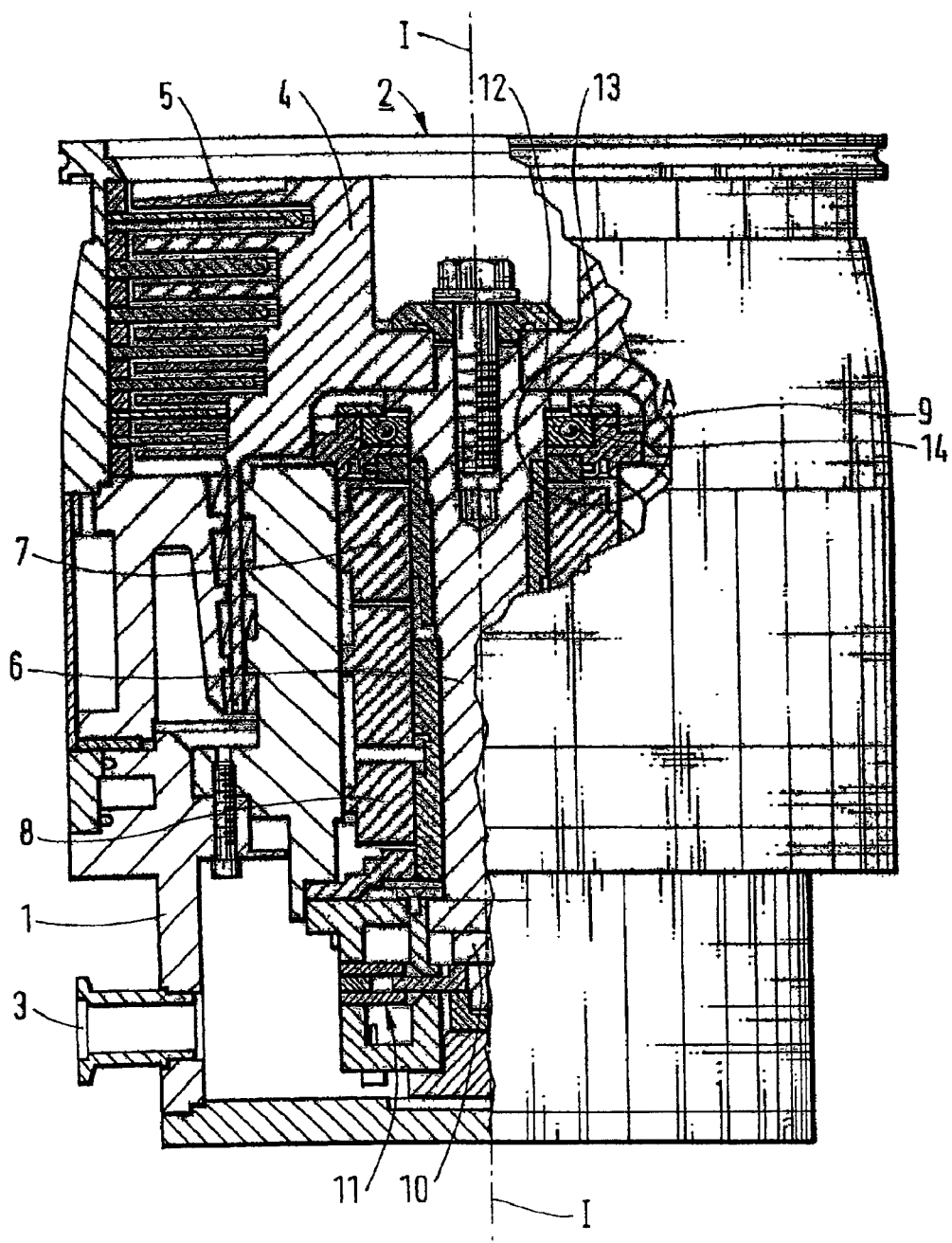
FIG. 1 is a general longitudinal section view of a vacuum pump whose rotor is held by magnetic bearings and by associated mechanical bearings for landing purposes.

In the embodiment of FIG. 1, a vacuum pump comprises in general manner a stator 1 having an axial suction inlet 2 and a radial delivery outlet 3. A rotor 4 is mounted to rotate axially inside the stator 1 about the longitudinal axis I—I. The rotor 4 has a suction system represented by fins 5, and a shaft 6 turning in bearings of the stator 1. In the figure, there can be seen two radial magnetic bearings 7 and 8, and two mechanical bearings for landing purposes 9 and 10 comprising radially-acting ball bearings. For the record, there can also be seen an axial magnetic bearing 11.

In normal operation, i.e. in the absence of excessive stress on the shaft 6 of the pump and assuming that the magnetic bearings are themselves operating normally, the magnetic bearings hold the rotor 4 correctly in an axially-centered position, and the mechanical landing bearings 9 and 10 do not touch the shaft 6.

In the mechanical landing bearing 9, there can be seen a rotor bearing ring 12, placed close to and around the shaft 6 of the rotor 4, and a coaxial stator bearing ring 13 placed in contact with the stator 1. Between them, the rotor ring 12 and stator ring 13 define a running housing 19. Rolling elements 14 such as balls, needles, or any other conventional type of rolling element, are received in the running housing 19 between the rotor ring 12 and the coaxial stator ring 13, so as to constitute a rolling bearing allowing the two rings 12 and 13 to rotate axially relative to each other.

Figure 2:
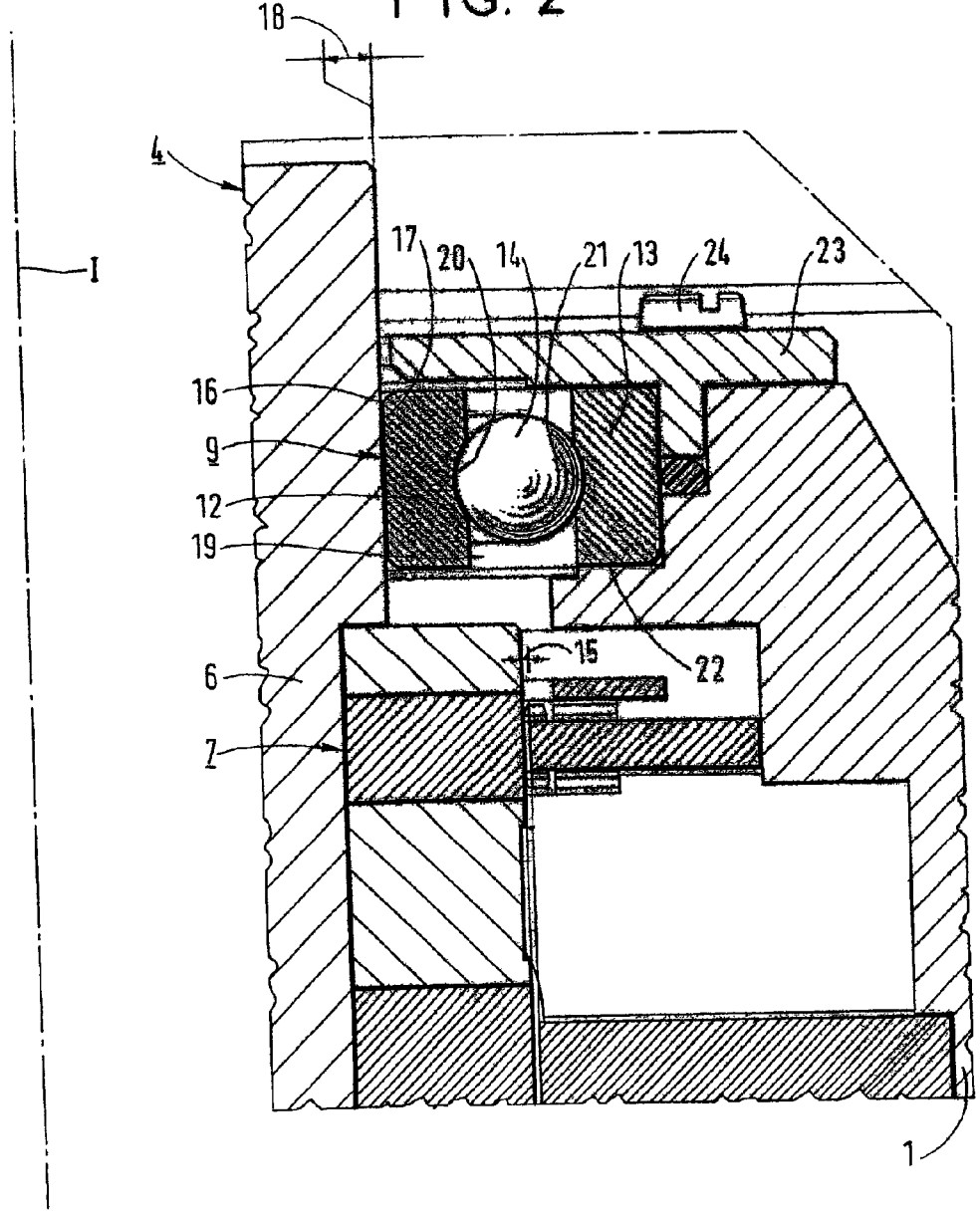
FIG. 2 is a detail section view on a larger scale of zone A in FIG. 1, showing half of a mechanical landing bearing in an embodiment of the present invention.

Reference is now made to FIG. 2 which shows half of the mechanical landing bearing 9 in greater detail and on a larger scale in situation between the shaft 6 of the rotor 4 and a corresponding portion of the stator 1. There can be seen a rolling element 14 in the running housing 19 between the rotor ring 12 and the coaxial stator ring 13. The rolling element 14 rolls on respective running tracks 20 and 21 of the rotor and stator rings 12 and 13. There can also be seen the radial magnetic bearing 7 which, in normal operation, serves to center the shaft 6 of the rotor 4 in the stator 1 leaving an empty annular airgap 15 that defines the maximum radial displacement available for the shaft 6 inside the stator 1. Under normal circumstances, the airgap 15 can be about 0.2 to 0.4 mm wide, for example. The purpose of the mechanical landing bearing 9 is to limit the maximum radial displacement available to the shaft 6 of the rotor 4 inside the stator 1 to a value which is considerably smaller than the size of this airgap 15 so as to avoid damaging the magnetic bearings in the event of a landing.

Between the inner annular face 16 of the rotor ring 12 and a corresponding first bearing surface 17 of the rotor 4, radial clearance 18 is left that is considerably smaller than the airgap 15 and that is only slightly greater than the precision with which the rotor 4 is normally held centered by the radial magnetic bearing(s) 7. This precision with which the rotor 4 is normally held centered is generally very good, being less than a few microns.

The coaxial stator ring 13 is engaged and strongly braked or prevented from rotating in a housing at the end of the stator 1 between an axial shoulder 22 and a fixing ring 23 held on the stator 1 by screws, with the head of one such screw 24 being visible in the figure.

Figure 3:
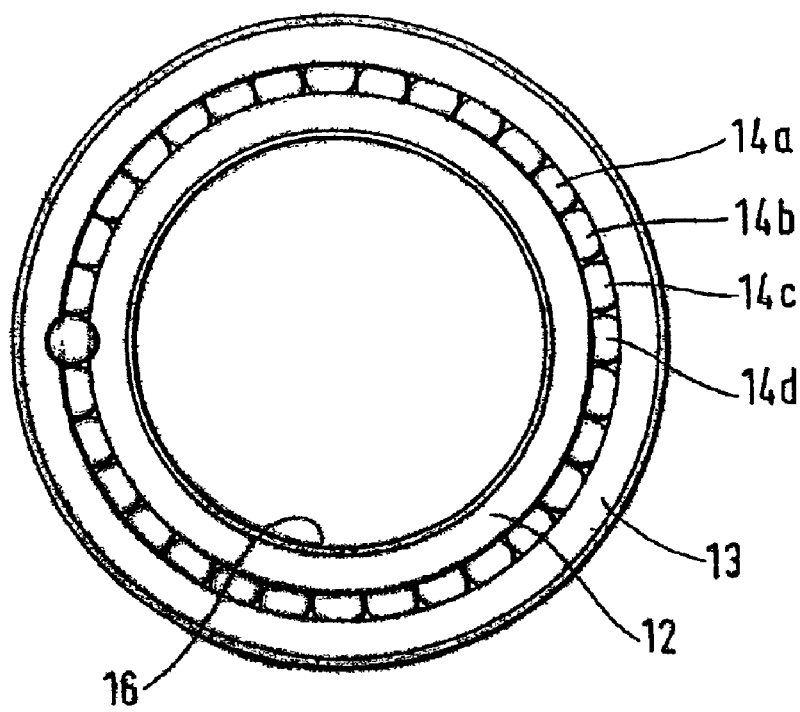
FIG. 3 is a face view on a larger scale of a landing bearing constituting an embodiment of the invention.
Figure 4:
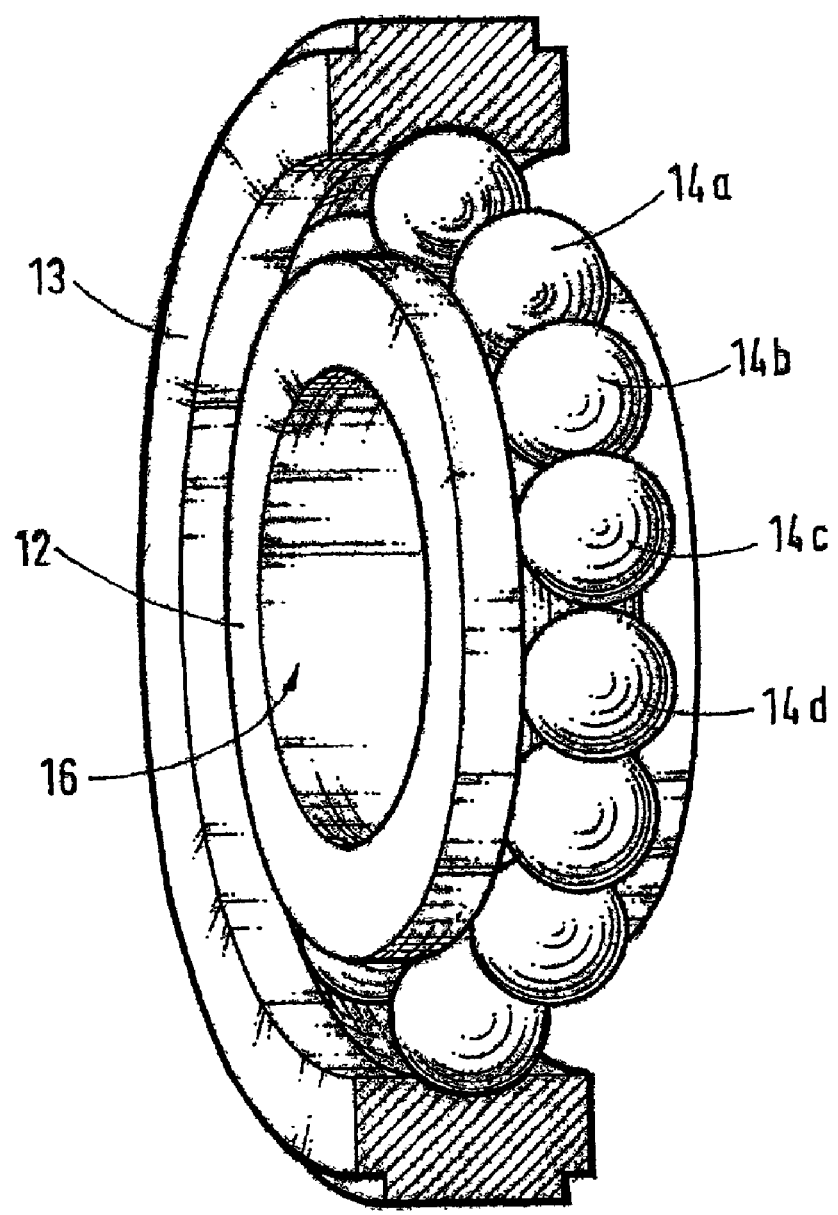
FIG. 4 is a perspective view in partial section of the FIG. 3 landing bearing.

In the embodiment shown in FIGS. 3 and 4, the landing bearing comprises rolling elements in the form of spherical balls. These rolling elements comprise an alternating succession of rolling elements having outside surfaces made of steel and rolling elements having an outside surface made of ceramic. Thus, for example, the rolling elements 14a and 14c have steel outside surfaces, while the rolling elements 14b and 14d have ceramic outside surfaces.

For the rolling elements 14a and 14c made of steel, it is advantageous to use a stainless steel.

For the ceramic rolling elements 14b and 14d, it is advantageous to use silicon nitride.

During landing, the rolling elements 14a–14d are set into rotation, and adjacent rolling elements such as the elements 14a and 14b come into contact with each other via portions of their peripheral surfaces, thereby giving rise to friction. Because of the alternation between steel rolling elements and ceramic rolling elements, friction is always produced between two rolling elements that are made of different materials, which encourages slip and thus reduces the friction forces opposing rapid acceleration of the landing bearing.

The running tracks 20 and 21 (FIG. 2) can be a stainless steel.

Because only every other rolling element is made of a much expensive material such as ceramic, the extra cost of manufacture is reduced, while simultaneously obtaining very significant advantages in terms of the longevity of the landing bearing and of the vacuum pump in general.

Another advantage results from the presence of a certain number of rolling elements 14a, 14c being made of steel which is a good conductor of heat, thereby maintaining adequate capacity to cool the rotor. For this purpose, provision is made for the steel rolling elements 14a, 14c to remain in contact with the running tracks 20, 21 under normal operating temperature conditions.

In other words, under such normal operating temperature conditions, the ceramic rolling elements 14b, 14d are of a diameter which is preferably smaller than or not greater than the diameter of the steel rolling elements 14a, 14c.

During landing, operation is as follows: initially, the rotor ring 12 does not touch the shaft 6 which is rotating at high speed about its longitudinal axis I—I. When the radial magnetic bearings such as the bearing 7 cease to operate, the rotor 4 can move radially across the first radial clearance 18 until it makes contact with the rotor ring 12 which is initially stationary and which suddenly finds itself set into rotation, thereby also setting into rotation the rolling elements 14. The coaxial stator ring 13 is locked or at least braked so far as rotation is concerned within the stator 1.

Because of inertia and friction in the landing bearing, the rotor ring 12 does not instantaneously take on the high speed of rotation of the rotor 4. Rubbing therefore occurs between the bearing surface 17 of the rotor 4 and the corresponding annular inside face 16 of the rotor ring 12. Because of the reduction in the friction forces that exist between the adjacent rolling elements 14, the rotor ring 12 can accelerate quickly, thereby reducing the length of time that rubbing occurs between the bearing surface 17 of the rotor 4 and the inside annular face 16 of the rotor ring 12.

The present invention is not limited to the embodiments described explicitly above, but covers variant generalizations within the competence of the person skilled in the art.

In particular, the landing bearings 9 and 10 could be secured to the rotor 4 instead of being secured to the stator.

What is claimed is:

1. A landing bearing for a vacuum pump, comprising:
    a rotor ring and a coaxial stator ring defining a roller housing between them; and
    rolling elements housed one after another in the roller housing and rolling on respective running tracks of the rotor ring and stator ring;
    wherein the rolling elements comprise an alternating succession of rolling elements having outside surfaces made of steel and of rolling elements having outside surfaces made of ceramic,
    and wherein the ceramic rolling elements are of a diameter which is equal to the diameter of the steel rolling elements under normal operating temperature conditions.

2. A landing bearing according to claim 1, wherein the rolling elements are spherical balls.

3. A landing bearing according to claim 1, wherein the steel rolling elements are made of stainless steel.

4. A landing bearing according to claim 1, wherein the ceramic rolling elements are made of silicon nitride.

5. A landing bearing according to claim 1, wherein the running tracks are made of stainless steel.

6. A vacuum pump including at least one landing mechanical bearing comprising a landing bearing according to claim 1.

7. A vacuum pump according to claim 6, comprising a rotor mounted to rotate in a stator with at least one radial magnetic bearing which, in normal operation, holds the rotor in a radially centered position inside the stator, and with at least one mechanical landing bearing comprising a landing bearing which, in the event of normal operation of the radial magnetic bearings failing, limits radial displacements of the rotor within the stator by ensuring that the rotor remains approximately centered, radial clearance being provided between one of the rotor ring or stator ring and the corresponding bearing surface of the rotor or of the stator.

* * * * *